United States Patent [19]

Jackson, Jr. et al.

[11] 4,391,547

[45] Jul. 5, 1983

[54] QUICK RELEASE DOWNHOLE MOTOR COUPLING

[75] Inventors: G. C. Jackson, Jr., Dallas; Kenneth W. Bramlett, Arlington; James G. Dennis, Pottsboro, all of Tex.

[73] Assignee: Dresser Industries, Inc., Dallas, Tex.

[21] Appl. No.: 325,395

[22] Filed: Nov. 27, 1981

[51] Int. Cl.³ .............................................. F16D 1/10
[52] U.S. Cl. .................................. 403/341; 403/286; 464/157
[58] Field of Search ............... 403/341, 305, 364, 334, 403/286; 464/157

[56] References Cited

U.S. PATENT DOCUMENTS 2,990,895 7/1961 Works et al. .................... 175/107
3,159,222 12/1964 Hammer et al. ................. 175/107

FOREIGN PATENT DOCUMENTS 40-25442 9/1965 Japan .................................. 403/305

OTHER PUBLICATIONS

Erick Oberg and Franklin D. Jones "Machinery's Handbook", Nineteenth Edition, Fifth Printing, 1973—Standard Tapers, pp. 1678 and 1679.

Primary Examiner—Andrew V. Kundrat
Attorney, Agent, or Firm—Eddie E. Scott; Fred A. Winans

[57] ABSTRACT

An improved quick release coupling assembly for a drive shaft of a downhole motor is disclosed. The quick release coupling has an internally tapered collar to cause the mating taper on the outside surfaces of the clutch dogs to be held firmly by the collar and in intimate engaging relationship between the mating tapered surfaces. The angle of the mating tapered surfaces is greater than a self-locking angle so that the quick release feature permits easy disassembly of the joint, and thus the tool, on the rig floor or as well as in the shop.

4 Claims, 3 Drawing Figures

QUICK RELEASE DOWNHOLE MOTOR COUPLING

BACKGROUND OF THE INVENTION

1. Field of the Invention.

This invention relates generally to a downhole motor connected near the end of a drill string to drive a drill bit for forming borehole during the drilling for oil and gas and, more particularly, to a quick release coupling for the drive shaft of such a motor.

2. Description of the Prior Art.

Downhole motors are well known in the art of drilling for gas and oil and are particularly useful in situations such as directional drilling where it is preferred that the drill string is maintained stationary while the bit rotates. The motor is confined within a tubular housing, containing the rotor and stator thereof, threadably connected to another tubular portion of the housing enclosing the thrust bearing and radial bearing sections which support the rotating part through an interconnecting drive means therebetween. Due to the limited size of the borehole, the motor housings seldom exceed twelve inches in diameter and usually are on the order of six to eight inches. The limited diameters confine the internal design of the motor and bearing components causing the motor to be axially elongated in order to have a motor with sufficient power to rotate the drill bit. Because of the axial length, it is normally necessary to have threaded joints in the motor housing in addition to having joints in the interconnecting drive shaft assemblies to facilitate manufacturing and repair and maintenance at the rig site.

For ease of assembly it is desirable that the drive shaft within the housing be quick coupled, or have slide connections to facilitate handling and assembly by unskilled labor. Examples of such type of connections are well known in the art as shown for example in U.S. Pat. Nos. 2,990,895 and 3,159,222. While such connections as described therein have the ability to be quickly assembled and disassembled, vibration in the drive train will cause chattering resulting in excessive wear of the connector, ultimately resulting in failure thereof requiring premature tripping of the string to replace or repair the motor.

SUMMARY OF THE INVENTION

According to the present invention a quick release coupling for the drive shaft of a downhole motor is provided having a collar with an internal surface which is inwardly tapered from each end to engage mating tapered surfaces on the outside of the clutch dogs of the mechanism to maintain these surfaces in intimate contact with the collar as pressure drop across the rotor places an axial force on the tapered surfaces of the coupling. The torque engaging clutch dogs or fingers of each member are thus held firmly by the collar preventing the vibrations in the drive train from causing excessive wear on the coupling. Further, the taper angle, to retain the quick release capabilities, must be greater than a self-locking taper but, in order to maintain the wedging action for intimate contact to prevent wear, preferably, close to a locking taper. The quick release coupling could also be used to connect two or more rotors together in a down motor.

DESCRIPTION OF THE PREFERRED EMBODIMENT

Figure 1:
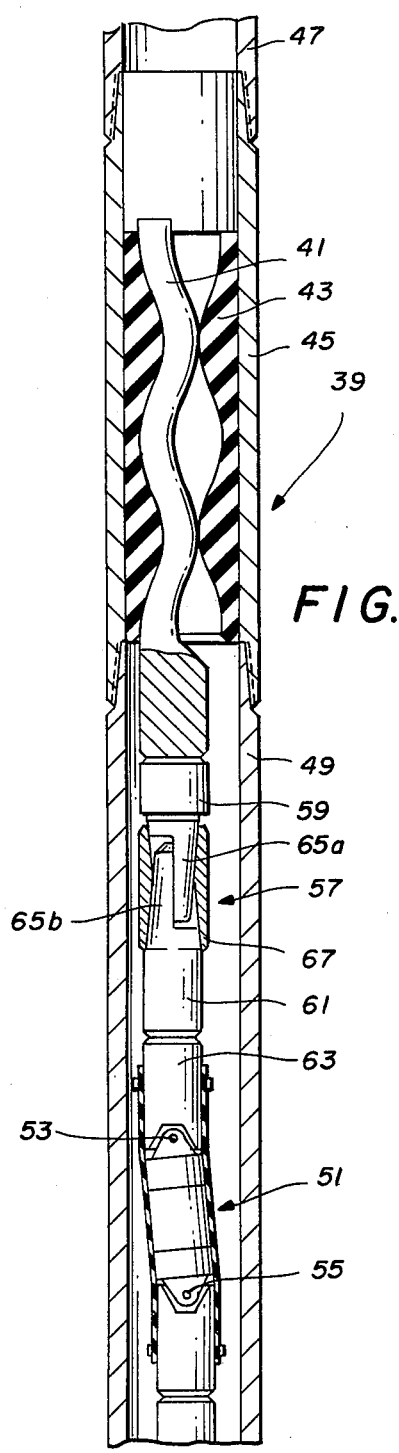
FIG. 1 is a cross-sectional elevational view of the upper portion of a downhole motor showing the drive shaft interconnected with a quick release coupling according to the present invention.

Referring to FIG. 1, a progressive cavity downhole motor 39 is shown as comprising a rotor member 41 and a stator member comprising a flexible lining 43 housed in a tubular housing 45 threaded at its upper end for attachment to the drill string 47 and at its lower end for attachment to another separate portion of the motor housing 49.

Housing 49, at its lower end (not shown) encloses the thrust and radial bearings for the drive train which, as is well known in the art, has a drill bit mounted exteriorly of the housing on the terminal end of the shaft.

A universal drive assembly 51 for drivingly interconnecting the lower end of the rotor 41 with the drive train through the bearings is housed within the upper portion of housing 49 and includes a pair of univeral joints 53, 55 for transmitting the rotational nutating motion of the rotor into rotational motion of the drive train through the bearings.

To facilitate shipping, manufacturing and assembly of the progressive cavity downhole motor, the rotor 41 and the universal drive 51 are interconnected by a quick release coupling assembly 57 also housed within the housing 49. The coupling assembly includes an upper stud member 59 threaded into the rotor 41 and a lower similarly configured stud member 61 threaded into the upper connection 63 of the universal drive assembly 51.

As is known in the prior art and shown in U.S. Pat. No. 2,990,895, previously identified, each stud member 59, 61 defines axially projecting interengaging fingers or clutch dogs 65 having mating engaging surfaces 69 for transmitting torque therebetween. A collar member 67 encloses and supports the clutch dogs 65a to 65b in axial alignment. In that the upper stud member 59 is retained on the rotor and the lower stud member 61 is retained on the universal drive assembly 51, assembly of the two housings 45 and 49 requires a blind stabbing of the upper clutch dogs 65a into the lower clutch dogs 65b, with a collar member 67 in place on either stud member. However, with the lower clutch dogs 65b chamfered as at 66, it is preferable to mount member 67 on upper clutch dogs 65a.

To facilitate such blind stabbing, heretofore the terminal ends of the fingers and the inside lip of the collar member have been chamfered for guided entry and engagement; however, as previously explained, the outer surface of the clutch dogs and the inner surface of the collar member were substantially cylindrical with substantial clearances therebetween to also facilitate assembly. (See FIG. 2 of U.S. Pat. No. 2,990,895)

Also heretofore, the ends of the collar member abutted shoulders on the opposing stud members to support the thrust load therebetween. Such construction permitted relative radial movement between the mating parts which was exacerbated by the nutating motion of the rotor resulting in early failure of the clutch coupling.

Figure 2:
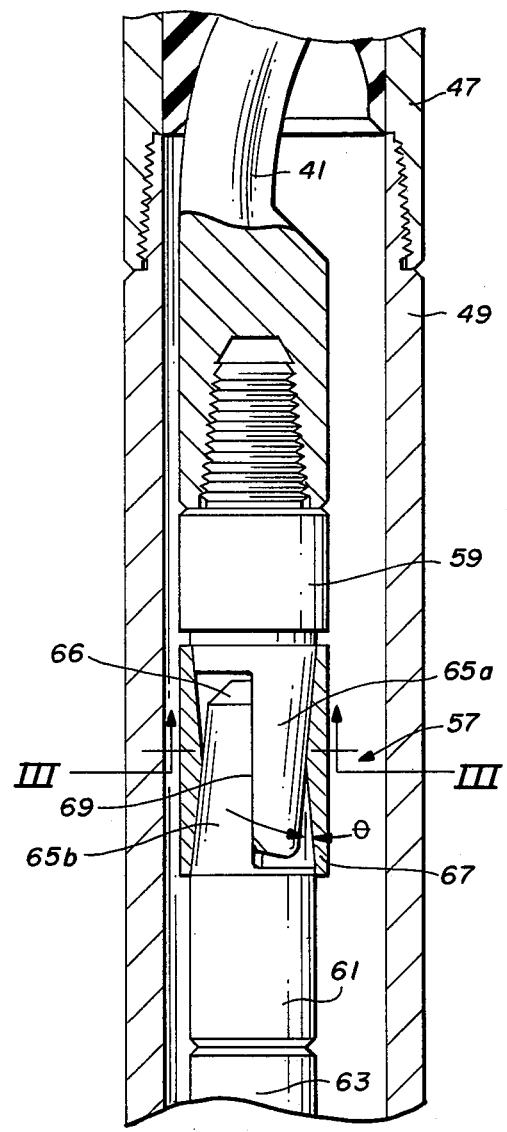
FIG. 2 is an enlarged view of the quick release coupling of FIG. 1.

Referring now to FIGS. 1 and 2, it is seen that the outer surface of the fingers or clutch dogs 65a and 65b according to the present invention are tapered inwardly in the direction of projection over a major portion of the axial extent on an angle θ.

The collar member 67 has an internal surface tapered radially inwardly from each end in a like included angle θ terminating at generally the axial mid-point thereof so that the outer surface of each finger is generally intimately engaged by the inner surface of the collar member over a major axial dimension of each finger.

It will be noted that the quick release coupling 57 of the present invention has no abutting shoulder for supporting the axial thrust and, as such, the thrust therefore is supported on the mating tapered surfaces of the collar 67 and finger 65a and 65b.

As there is intimate engagement between the inner surface of the collar and the outer surface of the fingers, the chatter or relative motion therebetween have been eliminated. Further, to the extent that the nutating motion may induce a wobble or chatter because of the eccentric loading between the fingers and collar, causing wear, such relative dimensional changes can be accommodated by further axial engagement between the fingers and the collar member to bring the thrust engaging surfaces back into intimate contact to eliminate the relative motion.

As in the prior art, the drive train in the lower housing is relatively axially stable because of the support of the bearings therein but, in that the rotor does have limited axial movement and due to the pressure drop of the motor fluid across the rotor, the quick release coupling assembly 57 must support various thrust loadings. However, to insure that the coupling is easily released for disassembly of the motor, the angle θ must be greater than a self-holding or self-locking taper but, to maintain the mating engaging surfaces in continuous contact to eliminate wobble, it is desirable that such angle be close to the wedging effect of a locking taper. For such purpose, an angle θ as defined by a taper of generally one and three-fourths inch per foot per side is preferable.

Figure 3:
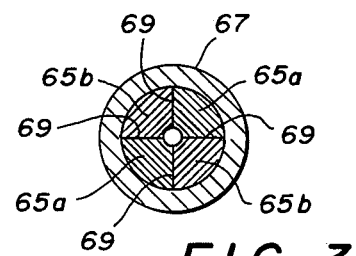
FIG. 3 is a cross-sectional view along lines III—III of FIG. 2.

Referring now to FIG. 3, it is shown that each stud member includes a pair of projecting fingers 65a, 65b with the torque engaging surfaces 69 therebetween being substantially planar and axially aligned. Further, it is noted that the outer surfaces defined by the fingers and the inner surface of the collar member are circular in cross-section and thus assembly of the collar on the fingers does not require orientation for providing the intimate contact.

We claim:

1. A quick release shaft coupling assembly for an axially aligned eccentrically rotating upper and lower drive shafts of a downhole motor comprising:

a first stud member mounted on said upper shaft and having downwardly extending clutch dog members defining an outer downwardly inwardly tapered surface and an axially extending torque transmitting surface;

a second stud member mounted on said lower shaft and having upwardly extending clutch dog members defining an outer upwardly inwardly tapered surface and an axially extending torque transmitting surface engaging said like surface of said upper member whereby the upper and lower members are mutually engaged along at least a portion of said axially extending surfaces for transmitting torque therebetween while being free to move generally axially relative to each other; and a collar member encircling the engaging clutch dog members throughout the axial extent of such engagement said collar member having an internal surface tapered radially inwardly from each end for mating intimate engagement on at least a portion of the outer tapered surfaces of said clutch dog members with all axial thrust transmitted between the opposed shafts being supported through said tapered engaging surfaces between said collar member and said clutch dog members and defining thrust transmitting surfaces for the coupling, whereby any wear of the thrust transmitting surfaces is accommodated by the tapered engagement permitting closer axial positioning between the respective members so that said intimate contact of the collar and said members is constantly maintained during torque transmitting operation.

2. Structure according to claim 1 wherein said inward taper of the outer surface of each said clutch dog member and from each end of said collar member is on the order of 1¾ inches per side per foot of axial length.

3. Structure according to claim 1 wherein said inward taper defines an angle with respect to the axis of said shafts of approximately 8.3 degrees.

4. A quick release coupling for a pair of axially aligned shafts, comprising:

a stud member on the adjacent ends of each shaft with each stud member defining axially extending clutch dog members having engaging axially extending torque transmitting surfaces and outer surfaces tapered radially inwardly in the direction of the extending member whereby the members are free to move generally axially relative to each other and maintain said engagement;

a collar member encircling said engaged clutch dog members and defining an internal surface tapered radially inwardly from each end for mating intimate engagement on at least a portion of the outer surface of each said clutch dog members with axial thrust transmitted between the aligned shafts being supported solely through said mating tapered surfaces and defining thrust transmitting surfaces for said coupling whereby any wear of the thrust transmitting surfaces is accommodated by the tapered engagement permitting closer axial positioning between the respective members so that said intimate contact of the collar and said members is constantly maintained during torque transmitting operation; and wherein, said taper is at least larger than a locking taper to ensure release of the coupling.

* * * * *